United States Patent [19]
Narita et al.

[11] Patent Number: 5,215,677
[45] Date of Patent: Jun. 1, 1993

[54] LIQUID CRYSTAL DISPLAY DEVICE

[75] Inventors: Kenichi Narita; Shoji Nakanishi, both of Tottori, Japan

[73] Assignees: Sanyo Electric Co., Ltd.; Tottori Sanyo Electric Co., Ltd., Osaka, Japan

[21] Appl. No.: 317,080

[22] Filed: Feb. 28, 1989

Related U.S. Application Data

[63] Continuation of Ser. No. 895,209, Aug. 11, 1986, abandoned.

Foreign Application Priority Data

| Sep. 27, 1985 | [JP] | Japan | 60-215265 |
| Oct. 14, 1985 | [JP] | Japan | 60-229329 |
| Jun. 24, 1986 | [JP] | Japan | 61-147667 |

[51] Int. Cl.$^5$ .............. C09K 19/56; C09K 19/30; G02F 1/13
[52] U.S. Cl. .............. 252/299.4; 252/299.01; 252/299.63; 359/76; 359/75
[58] Field of Search .......... 252/299.01, 299.4, 299.63; 350/340, 341, 347, 346; 359/75, 76

References Cited

U.S. PATENT DOCUMENTS

| 3,867,015 | 2/1975 | Iida et al. | 350/341 K |
| 3,910,682 | 10/1975 | Arai et al. | 252/299.4 |
| 4,038,439 | 7/1977 | Gibson et al. | 350/340 |
| 4,105,298 | 8/1978 | Levine et al. | 350/340 |
| 4,357,374 | 11/1982 | Ogawa | 428/1 |
| 4,381,886 | 3/1983 | Yokokura et al. | 252/299.4 |
| 4,437,731 | 3/1984 | Sudo et al. | 350/340 |
| 4,472,027 | 9/1984 | Okubo et al. | 350/340 |
| 4,593,977 | 6/1986 | Takamatsu et al. | 350/341 |
| 4,634,229 | 1/1987 | Amstutz et al. | 350/341 |
| 4,666,253 | 5/1987 | Yoshida | 350/334 |
| 4,674,842 | 6/1987 | Van de Venne | 350/340 |
| 4,735,492 | 4/1988 | Sekine et al. | 350/341 |
| 4,781,439 | 11/1988 | Yokokura et al. | 350/341 |
| 4,799,762 | 1/1989 | Kakuta et al. | 350/96.34 |
| 4,879,059 | 11/1989 | Hanyu et al. | 252/299.4 |

FOREIGN PATENT DOCUMENTS

| 142149 | 5/1985 | European Pat. Off. | 252/299.4 |
| 231781 | 8/1987 | European Pat. Off. | 252/299.01 |
| 55-163513 | 12/1980 | Japan | 252/299.4 |
| 57-34526 | 2/1982 | Japan | 252/299.4 |
| 57-42019 | 3/1982 | Japan | 350/340 |
| 57-169729 | 10/1982 | Japan | 350/341 |
| 57-177121 | 10/1982 | Japan | 252/299.4 |
| 58-91430 | 5/1983 | Japan | 252/299.4 |
| 58-142315 | 8/1983 | Japan | 350/340 |
| 58-172623 | 10/1983 | Japan | 350/341 |
| 59-60422 | 4/1984 | Japan | 252/299.4 |
| 1416836 | 12/1975 | United Kingdom | 350/341 |

Primary Examiner—Robert L. Stoll
Assistant Examiner—Philip Tucker
Attorney, Agent, or Firm—Darby & Darby

[57] ABSTRACT

A chiral nematic type liquid crystal display device in which the twist angle of a torsional structure of a liquid crystal layer is as large as 180° to 360° and the birefringence of liquid crystal molecules is utilized. This liquid crystal display device is characterized in that: a liquid crystal layer is disposed between opposed substrates and orientation films formed of straight chain polymer having fluoro-alkyl side chain $C_nH_mF_{2n+1-m}$ (n being a natural number and m being a natural number of 0 or 2n or less) are provided on the respective inner surfaces of said substrates facing the liquid crystal layer.

6 Claims, 3 Drawing Sheets

LIQUID CRYSTAL DISPLAY DEVICE

This is a continuation of application Ser. No. 895,209, filed Aug. 11, 1986 now abandoned.

BACKGROUND OF THE INVENTION

1. Field of the Invention

This invention relates to a liquid crystal display device having a liquid crystal layer in which liquid crystal molecules are oriented in a twisted structure and more particularly it relates to a liquid crystal display device in which liquid crystal molecules are oriented stably in a state suited for high speed operation even if the twisted structure has a large twist angle.

2. Description of the Prior Art

U.S. Pat. No. 3,918,796 discloses a twist nematic liquid crystal display device in which liquid crystal molecules are oriented to have a twisted structure of 90°. Such a liquid crystal display device having 90° twisted orientation has however a narrow viewing cone and is not suited for high level multiplexing drive. For example, in a display device of a matrix type, the contrast is decreased as the multiplexing ratio is increased, and when the display device is driven by a multiplexing ratio of 1/100, the contrast value becomes 3 to 5, which value can not put the device to practical use. Moreover, this contrast value is a value in case of viewing the display from a specified direction and the range of the visual angle is limited to about 20° or less in any direction with respect to a line perpendicular to the display face. Consequently, it follows that such a liquid crystal display device can not be applied to a large-area display (such as dot matrix display having a high resolution).

In view of the above described situation, studies were pursued as to the twist angle of liquid crystal. As a result, a liquid crystal display device using another display mode was proposed as disclosed in European Patent Application Laying-Open Gazette EPO-131,216. In this liquid crystal display device, the twist angle of a liquid crystal layer is made as large as 160° to 360° and by utilizing the birefringence of liquid crystal molecules, a practically applicable contrast value can be obtained even if the display device is driven at a multiplexing ratio of 1/100 to 1/200.

However, for a liquid crystal display device utilizing the above described display mode, it is required to make stable the orientation of liquid crystal molecules (namely, to take measures for undesirable domain and measures for pretilt angle control). To take measures for undesirable domain is to prevent lack of uniformity in the orientation due to increase of a twist angle. For example, if the liquid crystal molecules are forced to have a clockwise orientation, an anticlockwise orientation or an orientation of a different twist angle is partially occurred. When such phenomenon occurs, there is caused an ununiformity in the colors in the non-operated state or the response time in the operated state of the display device, resulting in a considerable decrease in the quality of display. On the other hand, to take measures for pretilt angle control is to prevent slow-down in the response time due to a low pretilt angle formed by liquid crystal molecules with respect to a substrate surface. Although a high molecule orientation film used for 90° twisted orientation has a pretilt angle of 0° to 2° (low pretilt angle), a pretilt angle in this display mode is required to be 5° or more, preferably 10° to 30° (high pretilt angle). Further, in case of a low pretilt angle in the above described mode, undesirable domains are liable to occur due to application of the threshold value.

In this regard, the above stated EPO-131,216 uses an orientation film obtained by evaporating an inorganic material obliquely onto a substrate so that a high pretilt angle orientation is obtained. However, since the incidence direction of evaporation is an important factor in making such an orientation film, such an orientation film obtained as a uniform film has a limited area, i.e., an area of only 10cm$^2$ at most. In addition, an acceptable allowance of thickness of a liquid crystal layer is small in this display mode and as a result if the thickness of the orientation layer lacks uniformity, this display device can not be used. For those reasons, such an oblique evaporation method is not suitable for production of a large-area display device or mass production of such display devices.

SUMMARY OF THE INVENTION

This invention has been accomplished for the purpose of solving the above described problems and it is an object of this invention to provide a liquid crystal display device having good stability in the orientation of liquid crystal molecules and suited for mass production in spite of a large twist angle in the orientation.

A liquid crystal display device of this invention comprises two substrates opposed to each other having inner surfaces facing each other, these inner surfaces each comprising a polymeric orientation film for homogeneously orienting liquid crystal molecules and an electrode. Between these substrates, there is provided a liquid crystal layer presenting a chiral nematic phase, having a structure twisted vertically with respect to each substrate. A polarizer is provided outside at least one of the outer surfaces of the substrates. Each of the above stated polymeric orientation films is formed of straight chain polymer having fluoro-alkyl side chain $C_nH_mF_{2n+1-m}$ (where n is a natural number and m is a natural number of 0 or 2n or less). Liquid crystal molecules are oriented in the liquid crystal layer so that the twist angle in the twisted structure in the non-field state has a value from 180° to 360°.

The present invention has been made by taking notice of interference between the liquid crystal molecules and the side chains of polymer constituting the orientation films. The above described polymeric orientation films can be formed by a simple method such as printing or coating without using oblique evaporation as in the prior art. Therefore, productivity of display devices using such orientation films can be remarkably improved. Although the pretilt angle (which means an angle formed by the liquid crystal molecules with respect to the substrate surface) is less than 5° in the non-field state because the above described polymeric orientation films are used, the pretilt angle in a weak field state or a residual field state is increased by taking account of the van der Waals force or the excluded volume effect influencing the orientation and accordingly excellent response characteristics can be obtained. Furthermore, as clearly understood from the following description of the present specification, liquid crystal molecules are selected appropriately so that they are oriented stably over a wide display area. Thus, the present invention makes it possible to manufacture efficiently a liquid crystal display device having a large display area which presents various merits such as suitability for high level multiplexing drive and a wide viewing cone in the display mode having a large twist angle and utilizing the birefringence of liquid crystal molecules.

These objects and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
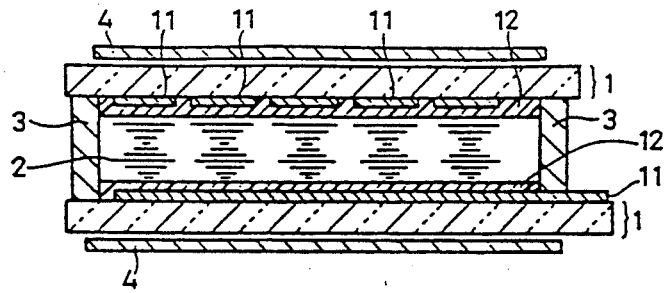
FIG. 1 is a sectional view of a liquid crystal display device of an embodiment of this invention.

FIG. 1 is a sectional view of a liquid crystal display device of an embodiment of this invention. The reference numeral 1 denotes substrates opposed to each other. On each of the opposed inner surfaces thereof, there are provided transparent electrodes 11 for applying electric field to liquid crystal and an orientation film 12 for homogeneously orienting liquid crystal molecules. The reference numeral 2 denotes a liquid crystal layer interposed between the substrates 1 and this liquid crystal layer presents a nematic phase and has a chiral nematic display mode having a structure twisted by 180° to 360° as indicated in the above stated prior art document EPO-131,216. The reference numeral 3 denotes a sealant for forming a liquid crystal container for keeping the liquid crystal layer 2 between the substrates 1. Polarizing plates 4 are disposed outside the substrates 1 so that the liquid crystal layer 2 is located therebetween. Otherwise, such polarizing plates may be omitted by making the substrates 1 have a polarizing function or a polarizing plate may be provided only on one of the outer sides of the substrates 1.

The above described liquid crystal layer 2 has a thickness of 7μm with Δn of 0.12 to 0.13, for example, so that a twisted structure can be easily formed dependent on a rotary polarization material. More preferable conditions for the liquid crystal layer 2 will be described afterwards.

As for the orientation films 12, an orienting material as indicated in Japanese Patent Laying-Open Gazette No. 163513/1980, 91430/1983 or 104129/1985 for example is principally employed in this invention. However, it is to be noted that those orienting materials sometimes produce a homeotropic orientation dependent on the manner of usage thereof as described in detail afterwards and as a result it becomes difficult to obtain a display mode having a large twist angle by homogeneous orientation and utilizing a birefringence effect of liquid crystal.

EXAMPLE 1

Ring-opening copolymerization was made with various ratios of the below indicated ε-caprolactam in which one of hydrogen atoms is substituted by $CF_3$

Figure 2:
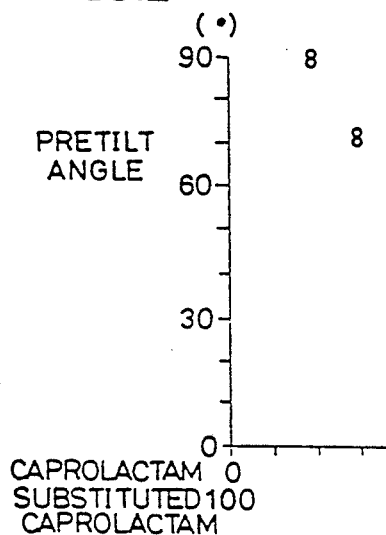
FIG. 2 is a graph showing a relation between $-CF_3$ substitution ratio and a pretilt angle of liquid crystal molecules in the embodiment 1.

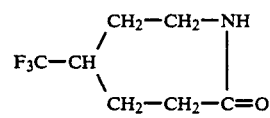

and ε-caprolactam, so that an average molecular weight of approximately 10000 atomic unit was obtained. This substance was dissolved in N—methyl—2—pyrrolidone in a concentration of 8%. Then, this solution was coated and dried on a pair of substrates of glass each having a base layer and an electrode film so that a film of 1000Å was obtained on each substrate. This film was rubbed in one direction by using a cotton cloth and an orientation film 12 was obtained. Then, a gap between the substrates was adjusted to make the gap for the liquid crystal layer 2 have a thickness of 10μm. After that, liquid crystal ZLI1840 (of nematic phase) produced by Merck Inc. was filled into the gap and thus a liquid crystal display device was formed. The rubbing directions of the substrates 1 were opposite to each other so that the minimum angle 180° may be obtained as the above stated twist angle for the purpose of analyzing the characteristics. A relation between the $-CF_3$ substitution ratio and the pretilt angle of liquid crystal molecules (measured by a magnetic-capacitance method) is as shown in FIG. 2, in which a ratio of substituted caprolactam is more than 20% and less than 60% in order to make the pretilt angle have a suitable value, namely, more than 5° and less than 40° in this display mode. It was found that although it is difficult to control the pretilt angle finely by every 1° or every 0.5°, control of the pretilt angle by every 4° or every 5° (for example by 15°+2°) can be made by adjusting the quantity of mixture of substituted caprolactam (the substitution ratio of $-CF_3$).

EXAMPLE 2

Figure 3:
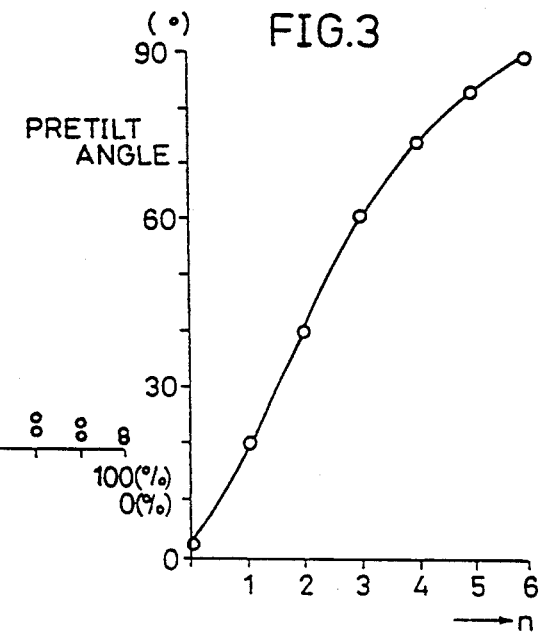
FIG. 3 is a graph showing a relation between the number n of $-C_nF_{2n+1}$ and a pretilt angle in the embodiment 2.

The substitution ratio by fluoro-alkyl side chain was 50% and the number n in $-C_nF_{2n+1}$ was changed successively so that a similar liquid crystal cell was formed. The characteristics of this liquid crystal cell were as shown in FIG. 3, where the pretilt angle became large according to the increase of n. In order to make the pretilt angle be in a range from 5° to 40°, n needs to be 1 or 2. Since the fluoro-alkyl side chain exerts the most important influence on the excluded volume effect which is one of the factors in the orientation, $-C_nHF_{2n}$ containing hydrogen may be used. In this case, it was understood that the number n corresponding to the pretilt angle may be any of 1, 2 and 3.

EXAMPLE 3

Figure 4:
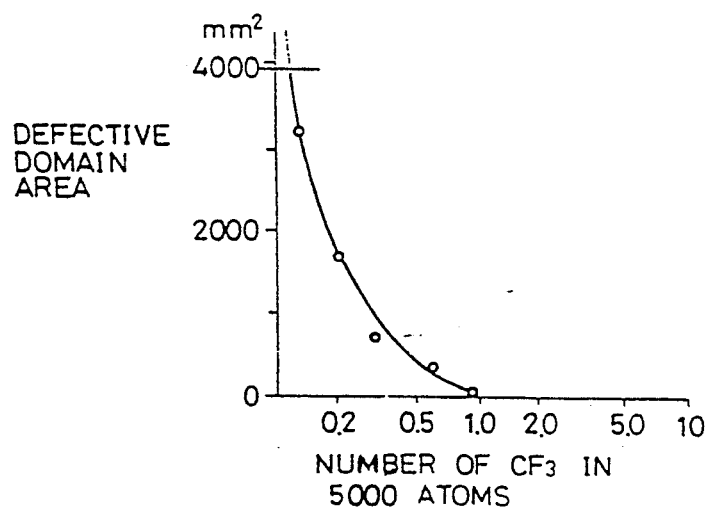
FIG. 4 is a graph showing a total area involving defective orientation in the effective display area in the embodiment 3.

The display devices in the Examples 1 and 2 were newly classified according to the mole ratios of substituted caprolactam and they were conducted continuously. FIG. 4 shows a total area of defective orientation (undesirable domain) generated in the effective display area of 180×220mm after application of plus and minus alternate pulses of 15V$_{o-p}$, 100μsec and 30Hz for 100 hours at room temperature. From FIG. 4, it is understood that the quantity of fluoro-alkyl side chains per unit number of atoms has a relation with the stability of monodomain. However, it is sufficient to know that one or more fluoro-alkyl side chains are required for 5000 atoms in principle since the relation shown in FIG. 4 is also related to kinds of liquid crystal molecules to be described afterwards.

EXAMPLE 4

Since the same effect as in the case of using the above stated caprolactam can be expected in forming polyamide by using diamine and dicarbonic amine, only one example will be given in the following.

Condensation polymerization was effected between hexamethylenediamine containing a part of main chains substituted by $CF_3$ and adipic acid so that an average molecular weight of approximately 10000 atomic unit was obtained. The material thus obtained was coated and dried on a pair of substrates of glass and then rubbed in the same manner as in the above stated Example 1. Then, liquid crystal presenting a nematic phase was interposed between the substrates. The pretilt angle at that time was approximately 15°. The above stated material in this example is a high molecular resin having polyamide bonding indicated by the following general formula:

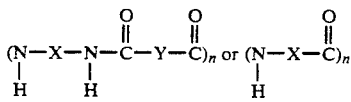

(where n is a natural number and X and Y are a single or a plurality of straight chain bonding groups such as methylene group, methylene-ether group, phenylene group or phenylene-ether group). Such a polymeric resin is advantageous in handling in that a polymerized form can be utilized since it can be solved in the solvent as compared with a polymeric resin having polyimide bonding to be described below.

However, as shown in the prior art as to the orienting material described previously, a polymeric resin having polyimide bonding can also be used effectively for orientation as in the polyamide resin although the polyimide resin is required to be polymerized on the substrates. For example, a polyimide resin expressed by the formula (I):

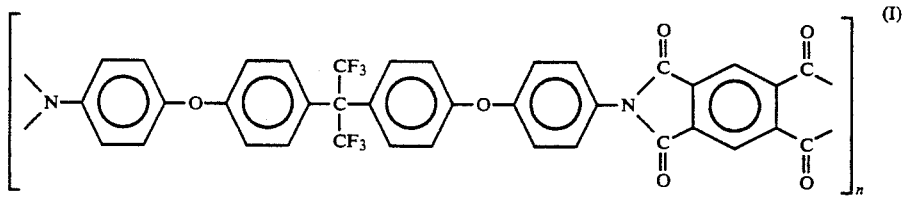

presented a more stable orientation according to this invention. An example of a resin having polyimide bonding will be indicated in the following Example 5.

EXAMPLE 5

Diamine having fluoro-alkyl side chain as in the following formula:

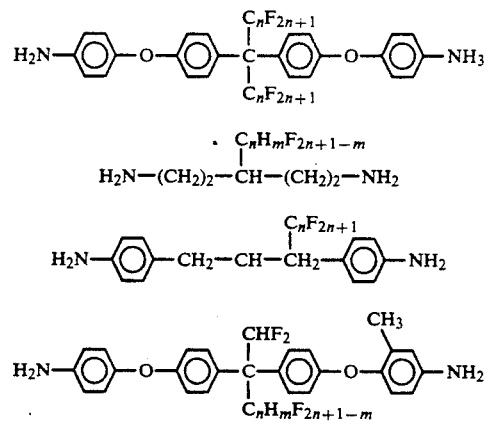

(where n and m are natural numbers) and carboxylic acid as indicated below:

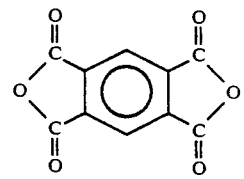

where condensed to form a polyimide resin. This resin was printed on a pair of opposed substrates and baked. Then, each of the resin materials on the opposed substrates was rubbed in one direction. The rubbing direction on one of the substrates and the rubbing direction on the other substrate were perpendicular to each other as viewed from the top (or the bottom), whereby a twist angle of 270° was attained. On that occasion, the pretilt angle was able to be regulated in a range from 5° to 30° according to the quantity of fluoro-alkyl side chains as observed by measurement by a magnetic-capacitance method.

The reasons for adopting the magnetic-capacitance method for measuring a pretilt angle in the above stated example are as follows. An optical method is usually adopted for measuring a pretilt angle in a liquid crystal display device. However, it is extremely difficult to measure a pretilt angle in this invention by an optical method. According to the results of a general analysis by the optical method, the tilt angle in the non-field state is 3° to 4° in any case. On the other hand, the magnetic-capacitance method makes use of the fact that when a magnetic field exceeding a threshold value is applied, liquid crystal showing positive dielectric anisotropy is rearranged by aligning the longitudinal axes (optical axes) of molecules in the field direction and an electric capacity caused by such phenomenon is detected by the magnetic-capacitance method. The conditions in the above described measurement of the pretilt angle are: a magnetic field of 30 to 60K gauss, a capacity measuring voltage of 0.5Vrms and a capacity measuring frequency of 1kHz. In consequence, it is understood in the present invention that although the pretilt angle in the non-field state has a small value, the pretilt angle rapidly increases if a small amount of electric field is applied.

Although importance was given to the pretilt angle and the orientation films in the above described embodiment, selection of liquid crystal materials is also important for making display of good quality. In one example, liquid crystal as indicated below:

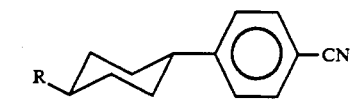

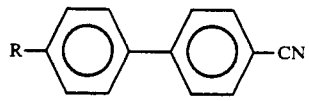

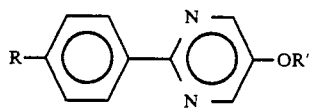

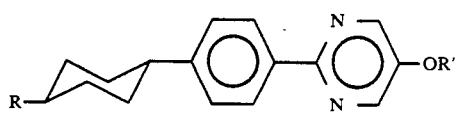

was used as the first group and liquid crystal as shown below:

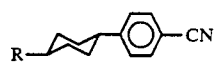

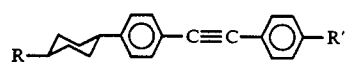

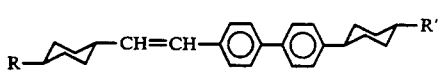

was sued as the second group. The liquid crystal of the first group has generally a rigid bonding, while the liquid crystal of the second group has a relatively flexible bonding caused by trans-cyclohexane ring. Between those groups, there is a difference in the characteristics as indicated below.

| liquid crystal used in a display device | first group | second group |
|---|---|---|
| pretilt angle in non-field state | 3° ± 0.4° | 4° ± 0.4° |
| pretilt angle in weak field state | ≈14° | ≈18 |
| maximum twist angle presenting stable | 230° | 275° |
| orientation domain | undesirable domain occurs if voltage exceeding a threshold value is applied | monodomain |

Thus, the pretilt angle is varied dependent on the liquid crystal materials and the uniformity in the orientation is also influenced by the liquid crystal materials. As for the uniformity in the orientation, not only the problem of whether the device consists of monodomain or contains undersirable domain but also the problem of whether the device is in a prescribed reproducible orientation state even if a voltage exceeding a threshold value is applied thereto is important.

Figure 5:
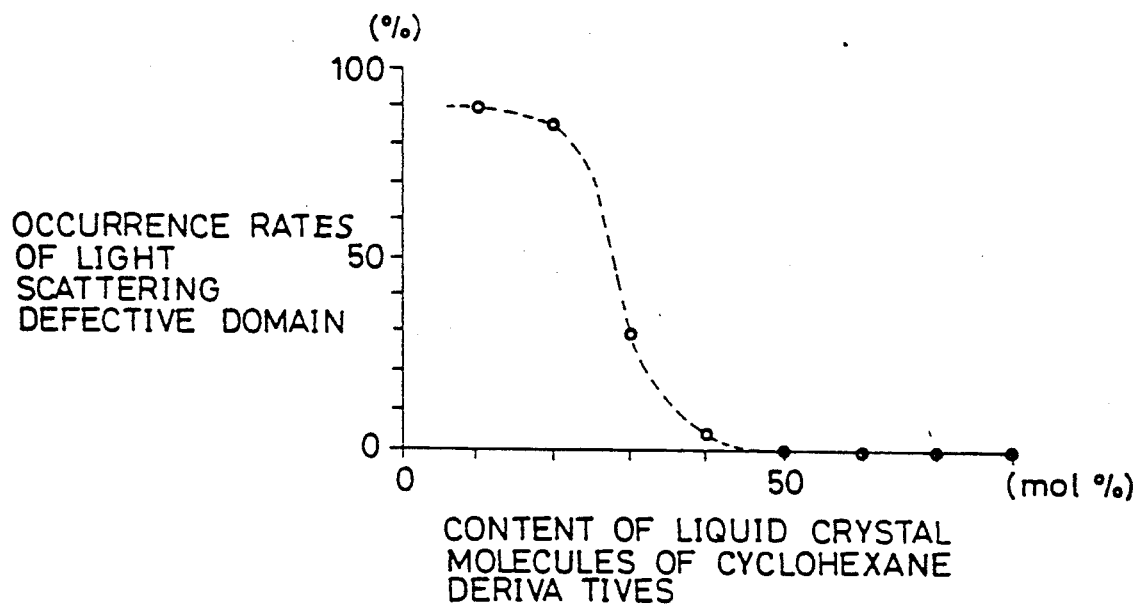
FIG. 5 is a graph showing a relation between a liquid crystal material and occurrence of undesirable domain.

FIG. 5 is a characteristic view showing the results of examination as to occurrence of undesirable domain dependent on the liquid crystal materials in view of the above stated problems. The liquid crystal of trans-cyclohexane derivatives having flexible bond in FIG. 5 means liquid crystal molecules of a structure in which the volume occupied by the molecules increases when the bonding between the carbon atoms is rotated. Those liquid crystals are for example the liquid crystals belonging to the above stated second group and besides them, the following liquid crystal can be cited.

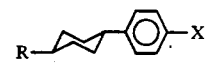

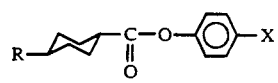

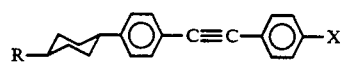

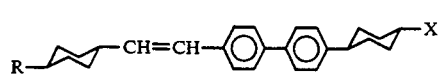

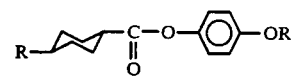

(where R is an alkyl group and X is a bonding group selected from a cyano group, an alkyl group, an alkoxy group).

If the content of such liquid crystal molecules having flexible skeleton exceeds 30mol%, monodomain is formed rapidly over a large area (for example an area larger than 100mm ×150mm). However, if a high voltage is applied, a light scattering domain is formed, bringing about a phenomenon in which a sufficient contrast can not be exhibited even if the voltage is increased to the saturation voltage after that. Such phenomenon does not occur if the content of liquid crystal molecules having flexible skeleton exceeds 50mol%. (In the above described example of the liquid crystal of the first group, the content of liquid crystal molecules having flexible skeleton is 20mol%.)

Figure 6:
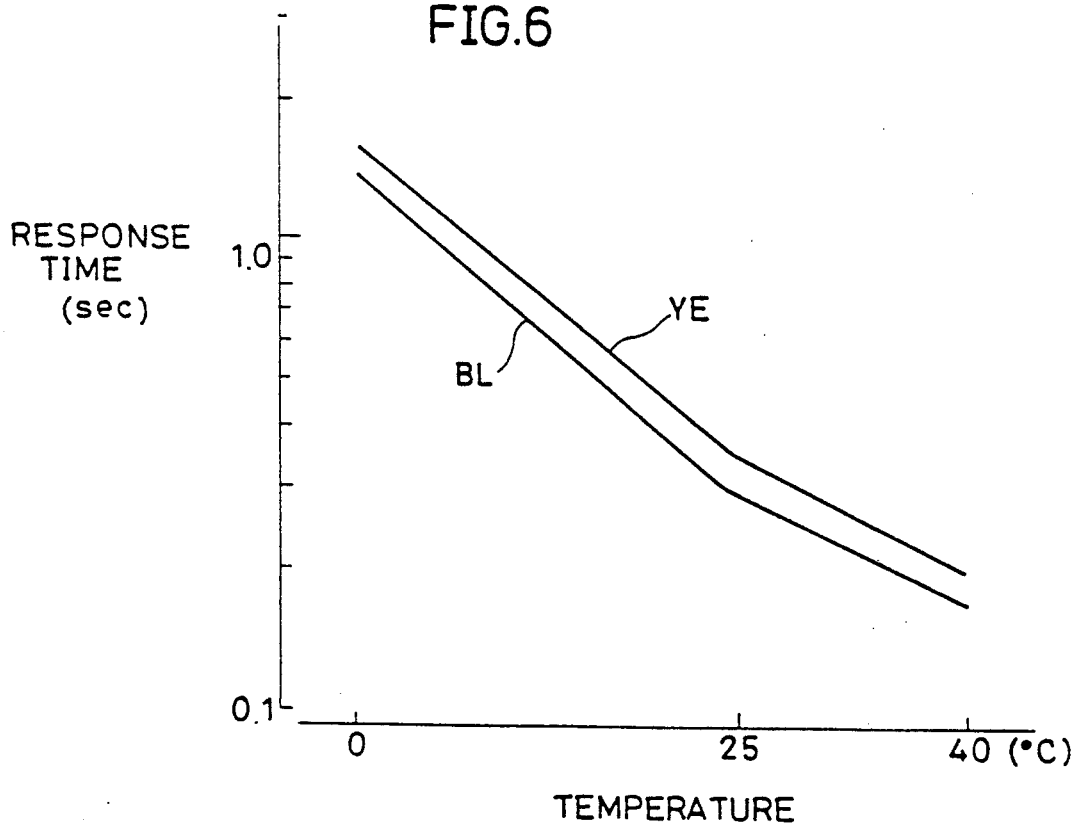
FIG. 6 is a graph showing responsive characteristics of a liquid crystal display device of an embodiment formed by using orientation films of polyimide resin.
Figure 7:
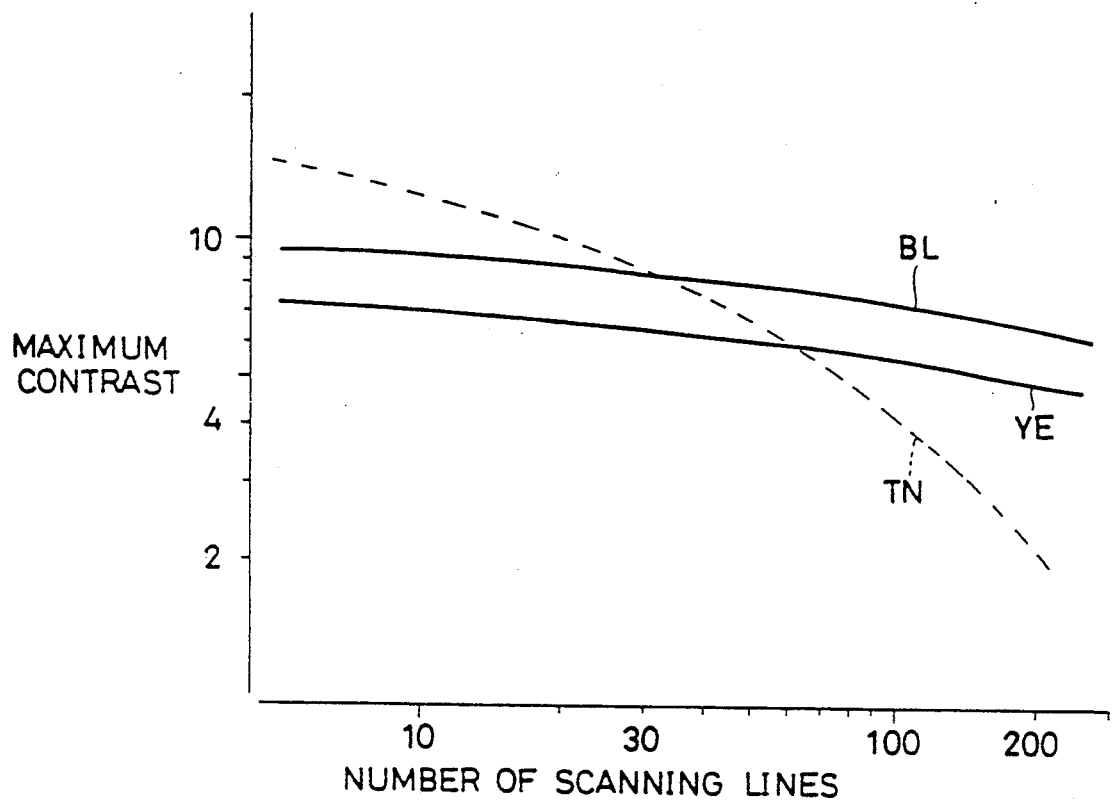
FIG. 7 is a graph showing a relation between the contrast and the display capacity in the embodiment in FIG. 6.

FIGS. 6 and 7 are characteristic diagrams of a liquid crystal display device in which the material indicated in the above stated formula (I) is used as a main constituent of the orientation film and the liquid crystal of the second group is used. In this display device, two kinds of display modes determined by the location of a polarizing plate are used. Those display modes are called a blue mode and a yellow mode dependent on the colors presented by the device when it is not operated. In the blue mode, a dark violet color is shown in the non-selected state and colorless in the selected state, as indicated by the mark BL attached to the characteristic curve in FIGS. 6 and 7. In the yellow mode, a light yellow color is exhibited in the non-select state and a dark indigo blue color is exhibited in the select state, as indicated by the mark YE in the figures. (The mark TN in FIG. 7 indicates a characteristic curve of a conventional 90° twisted orientation.)

FIG. 6 shows a response time with respect to a selection signal in the conditions of a multiplexing ratio of 1/200, a bias of 1/15 and a frame frequency of 128Hz. It can be seen from FIG. 6 that a practically effective response can be made at a temperature approximate to the room temperature.

FIG. 7 shows maximum contrast VS. number of scanning line. Although the maximum value of the angle of visibility is not shown in FIG. 7, the angle of visibility in this invention is approximately 60° with a duty cycle of 1/100 (the angle of visibility in the conventional example 20° in the 90° twisted orientation).

The multiplexability of the display can be evaluated by a sharpness (a ratio of the voltage for 80% saturation and the voltage for 20% saturation). The sharpness depends on the twisted angle in this display mode. By this evaluation, a display device of this invention has a particularly excellent characteristic in display and has an increasing sharpness of about 1.06 with a twist angle of 250° or more compared with the case of 90° twisted orientation. However, even with such combination of orientation films and liquid crystal, a reverse orientation occurs if the twist angle is too large. Therefore, in order to obtain a stable orientation, the twist angle is preferably less than 290°.

Figure 8:
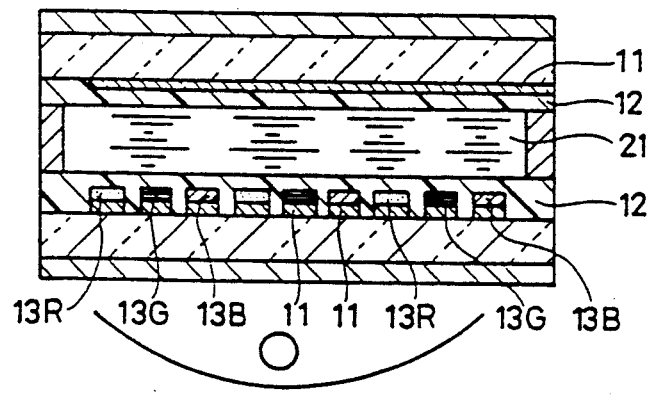
FIG. 8 is a sectional view showing another example of a structure of a liquid crystal display device in accordance with this invention, where color filter layer portions are provided outside a liquid crystal layer.

It was considered that color display could not be made because specified colors were shown as colors inherent to both the blue mode and the yellow mode. However, if cholesteril nonanonate of 2.0wt.% was added to liquid crystal, for example, ZLI3093 produced by Merck Inc. (mixture of three kinds of bicolor dye-stuffs in 1.3 to 3.1wt.% in total), a black color can be exhibited in the non-select state in the blue mode. Consequently, color display can be made if color filter layers 13R, 13G, 13B etc. of three colors are provided outside the liquid crystal layer 21 as shown in FIG. 8 and utilized in a transmission display manner.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A liquid crystal display device comprising:
   two substrates opposed to each other,
   a liquid crystal layer provided between said substrates, said liquid crystal layer having a helical structure twisted along a direction perpendicular to said substrates and having a chiral nematic phase, said liquid crystal layer including liquid crystal molecules having at least one cyclohexane ring therein,
   polymer orientation films formed on the respective inner surfaces of said substrates facing said liquid crystal layer for orienting liquid crystal molecules in a direction parallel to the planes of the substrates,
   electrodes formed on the respective inner surfaces of said substrates facing said liquid crystal layer,
   a polarizer provided on at least one of the outer sides of said substrates,
   said orientation films being formed of a polyimide or polyamide polymer having fluoro-alkyl side chain $C_nH_mF_{2n+1-m}$ wherein n and m are natural numbers, and wherein $n>0$, and $2n \geq m \geq 0$, and
   said liquid crystal molecules being oriented in said liquid crystal layer so that the twist angle of the twisted structure in a non-field state is an angle selected in a range from 180° to 360°.

2. A liquid crystal display device in accordance with claim 1, wherein the liquid crystal molecules in said liquid crystal layer contacting said orientation films are oriented so that an angle formed between the surface of each of said substrates and the liquid crystal molecules is less than 5° in a non-field state.

3. A liquid crystal display device in accordance with claim 1, wherein said liquid crystal layer contains 30mol% or more of liquid crystal molecules having at least one of trans-cyclohexane rings.

4. A liquid crystal display device in accordance with claim 3, wherein said liquid crystal molecules are liquid crystal molecules having at least one of trans-cyclohexane rings and selected among the groups shown by the following formulas

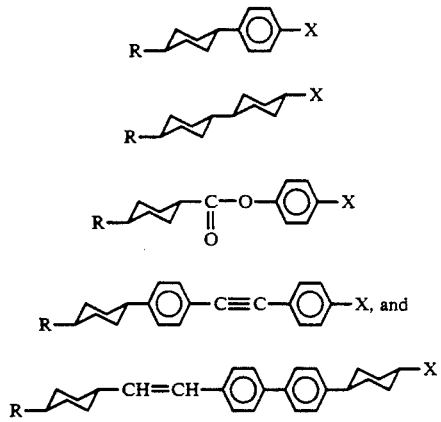

(where R indicates alkyl groups and X indicates a cyano group, an alkyl group or an alkoxy).

5. A liquid crystal display device in accordance with claim 1, wherein said orientation films are formed of polymers indicated by the following formula

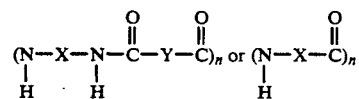

where X and Y are one or more compounds from the group consisting essentially of methylene, methylene-ether, phenylene, or phenylene-ether and said fluoro-alkyl group is bonded to said compound.

6. A liquid crystal display device in accordance with claim 1, wherein the twist angle of the twisted structure in said liquid crystal layer is an angle selected in a range from 250° to 290°.

* * * * *